United States Patent
Andrieux et al.

(10) Patent No.: US 11,967,870 B2
(45) Date of Patent: Apr. 23, 2024

(54) TOROIDAL POLYPHASE ELECTRIC MACHINE

(71) Applicant: MOVING MAGNET TECHNOLOGIES, Besançon (FR)

(72) Inventors: Gaël Andrieux, Evilard (CH); Arnaud Hyppias, Fraisans (FR); Laurent Herbein, Joncherey (FR)

(73) Assignee: MOVING MAGNET TECHNOLOGIES, Besancon (FR)

( * ) Notice: Subject to any disclaimer, the term of this patent is extended or adjusted under 35 U.S.C. 154(b) by 547 days.

(21) Appl. No.: 16/755,917

(22) PCT Filed: Oct. 16, 2018

(86) PCT No.: PCT/FR2018/052572
§ 371 (c)(1),
(2) Date: Apr. 14, 2020

(87) PCT Pub. No.: WO2019/077261
PCT Pub. Date: Apr. 25, 2019

(65) Prior Publication Data
US 2020/0295641 A1    Sep. 17, 2020

(30) Foreign Application Priority Data

Oct. 17, 2017  (FR) ...................................... 1759751

(51) Int. Cl.
*H02K 21/12*      (2006.01)
*H02K 1/14*       (2006.01)
*H02K 15/02*      (2006.01)

(52) U.S. Cl.
CPC ........... *H02K 21/125* (2013.01); *H02K 1/145* (2013.01); *H02K 15/022* (2013.01); *H02K 2201/12* (2013.01)

(58) Field of Classification Search
CPC .... H02K 21/125; H02K 1/145; H02K 15/022; H02K 2201/12
See application file for complete search history.

(56) References Cited

U.S. PATENT DOCUMENTS 6,211,595 B1 * 4/2001 Nose .................. G11B 19/2009
                                               310/216.057
7,145,280 B2 12/2006 Noble et al.
(Continued)

FOREIGN PATENT DOCUMENTS

DE   102004038882 A1 * 3/2005 ............. H02K 1/182
DE   102007012323 A1   5/2008
(Continued)

OTHER PUBLICATIONS

International Search Report and Written Opinion dated Jan. 31, 2019 in corresponding PCT Application No. PCT/FR2018/052572 (English and French).

*Primary Examiner* — Jianchun Qin
(74) *Attorney, Agent, or Firm* — Harness Dickey & Pierce, PLC

(57) ABSTRACT

The disclosure relates to an electric machine having a rotor including a set of permanent magnets and a stator including a stator strip made of a soft ferromagnetic material, the strip supporting a coil body having a single discontinuity, the coil body supporting a plurality of wire coils so as to form a polyphase coil stator assembly of the toroidal type, wherein the strip has a single discontinuity and has at least one partial cut at regular intervals between two consecutive wire coils.

7 Claims, 9 Drawing Sheets

(56) References Cited

U.S. PATENT DOCUMENTS

| | | | |
|---|---|---|---|
| 9,470,238 B2 | 10/2016 | Vande Sande et al. | |
| 2004/0036374 A1* | 2/2004 | Noble | H02K 1/12 310/179 |
| 2011/0285138 A1* | 11/2011 | Asanuma | H02K 15/022 290/55 |
| 2014/0035418 A1* | 2/2014 | Horst | H02K 3/46 310/216.074 |

FOREIGN PATENT DOCUMENTS

| | | |
|---|---|---|
| DE | 102010043976 A1 | 5/2012 |
| EP | 1324472 A2 | 7/2003 |
| JP | S55173254 U | 12/1980 |
| JP | H10271716 A | 10/1998 |
| JP | 2017070111 A | 4/2017 |
| WO | WO-2007/137656 A1 | 12/2007 |
| WO | WO-2014/087890 A1 | 6/2014 |
| WO | WO-2015/092408 A2 | 6/2015 |

* cited by examiner

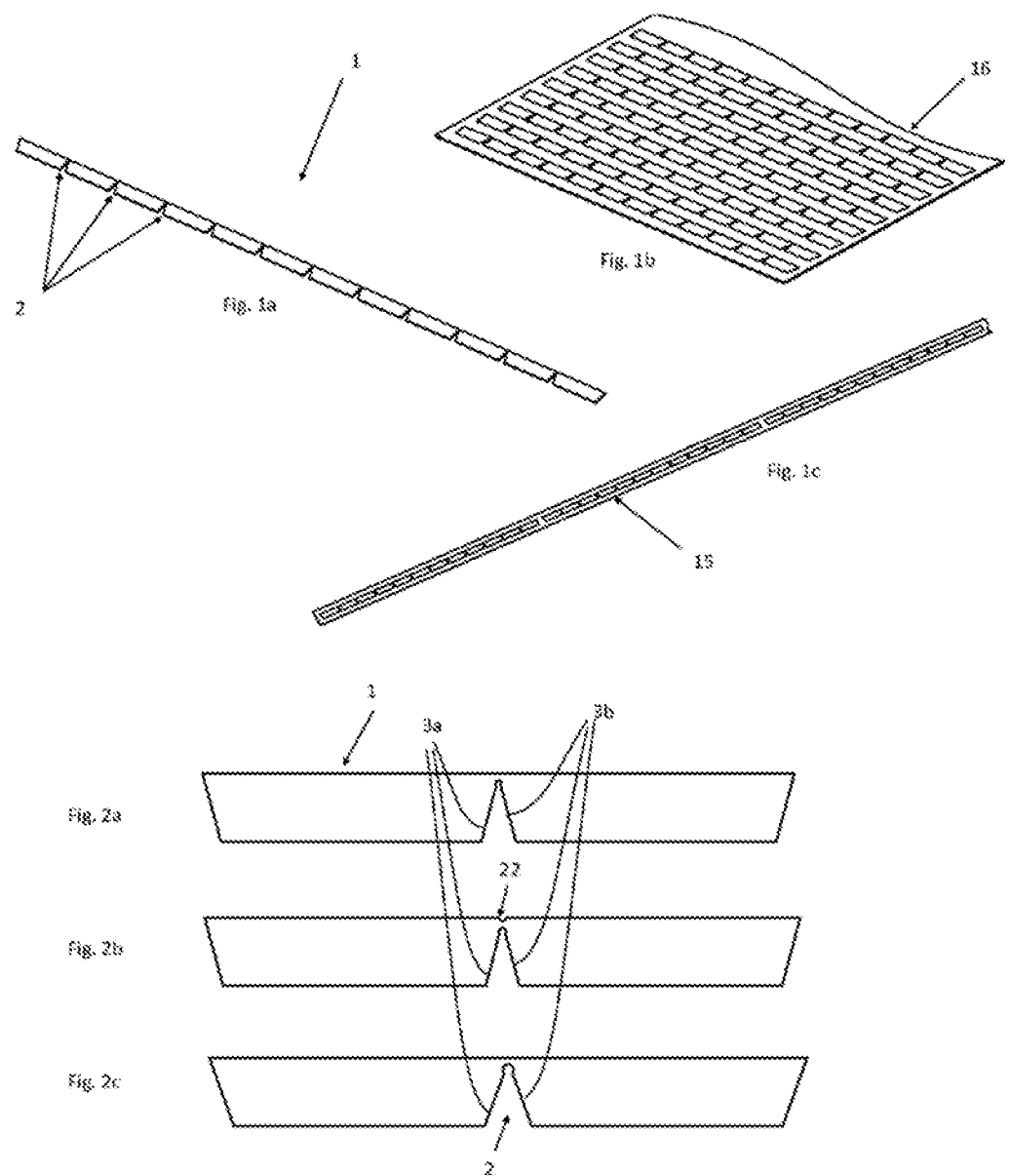

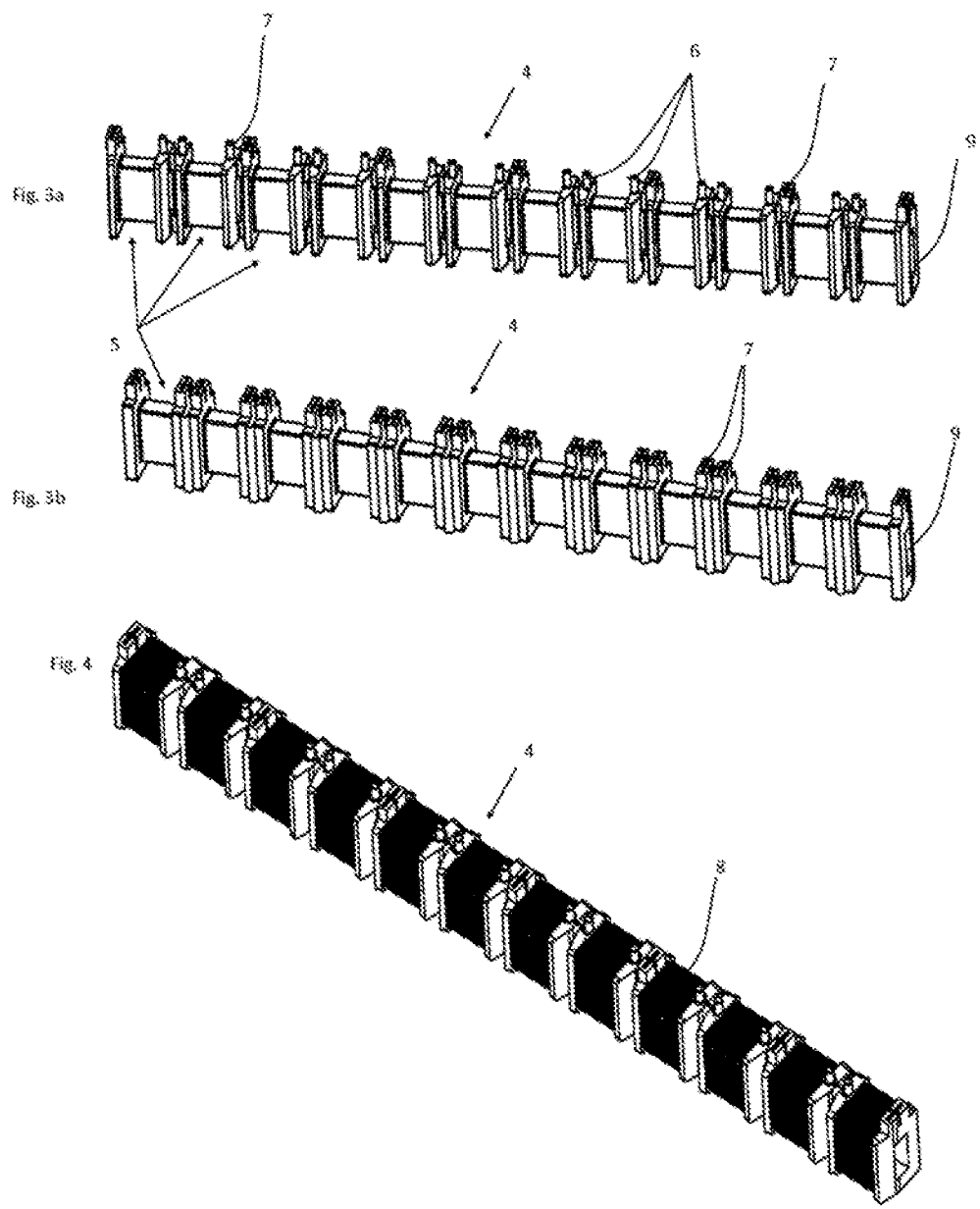

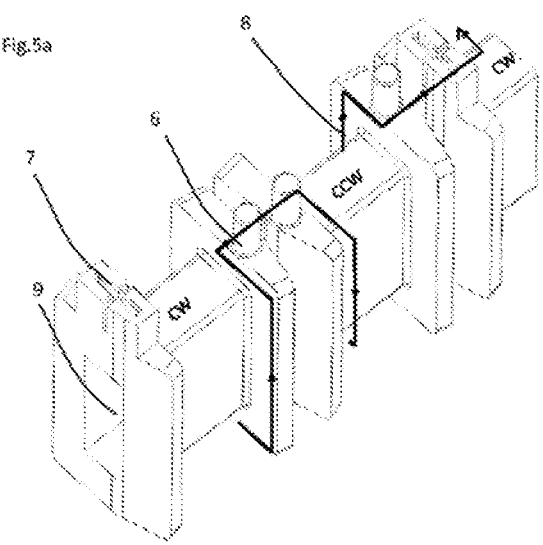
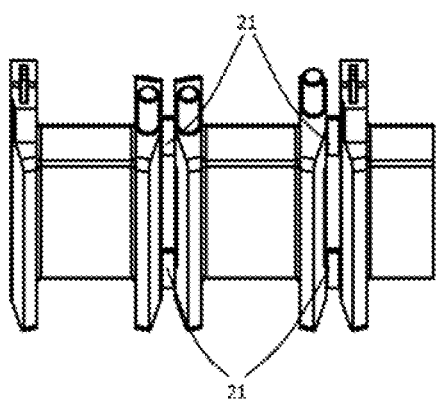
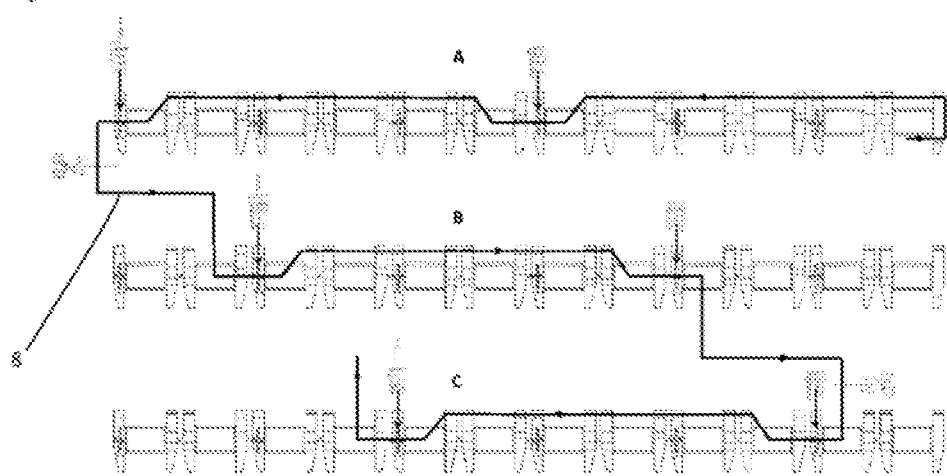

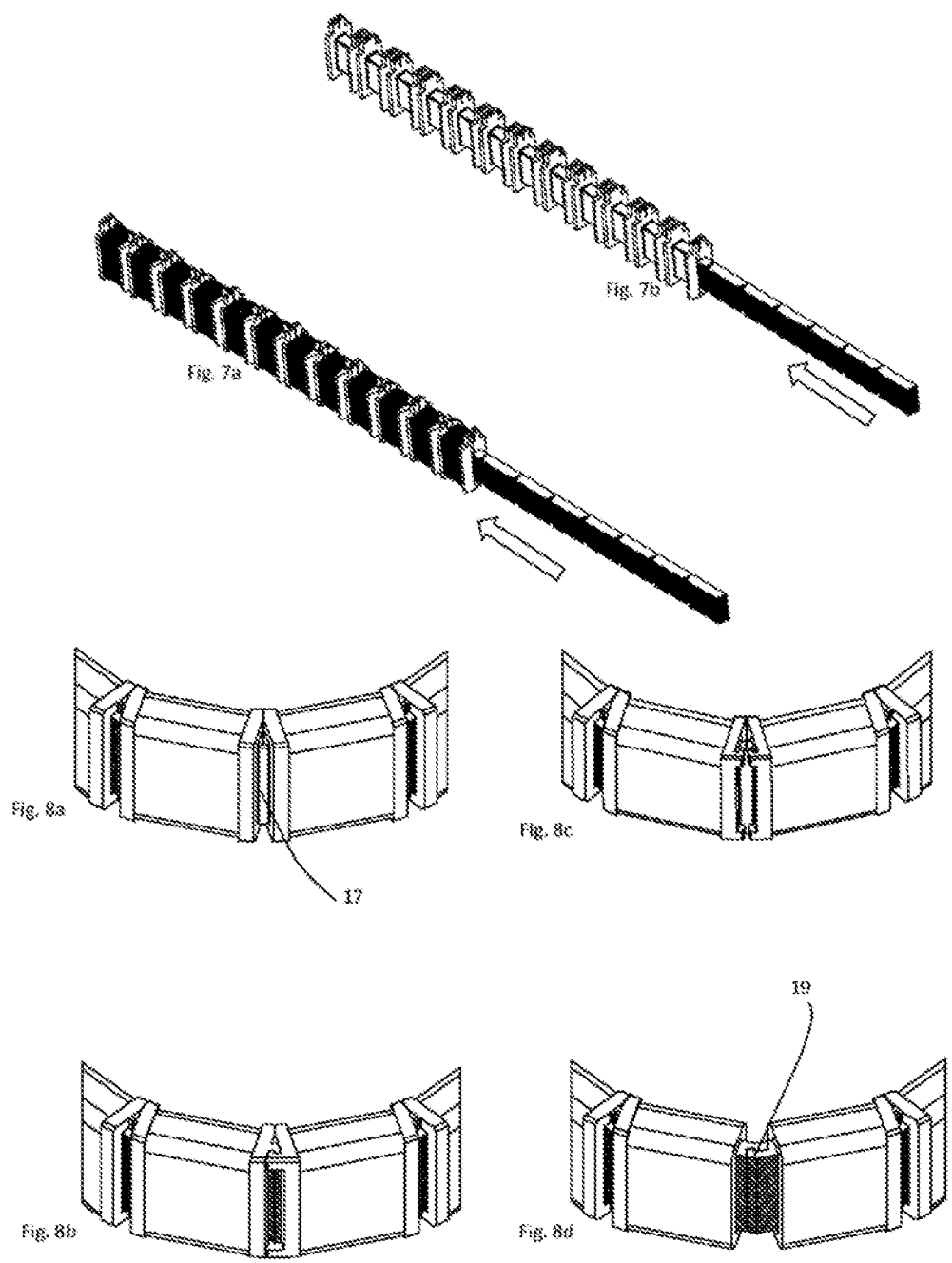

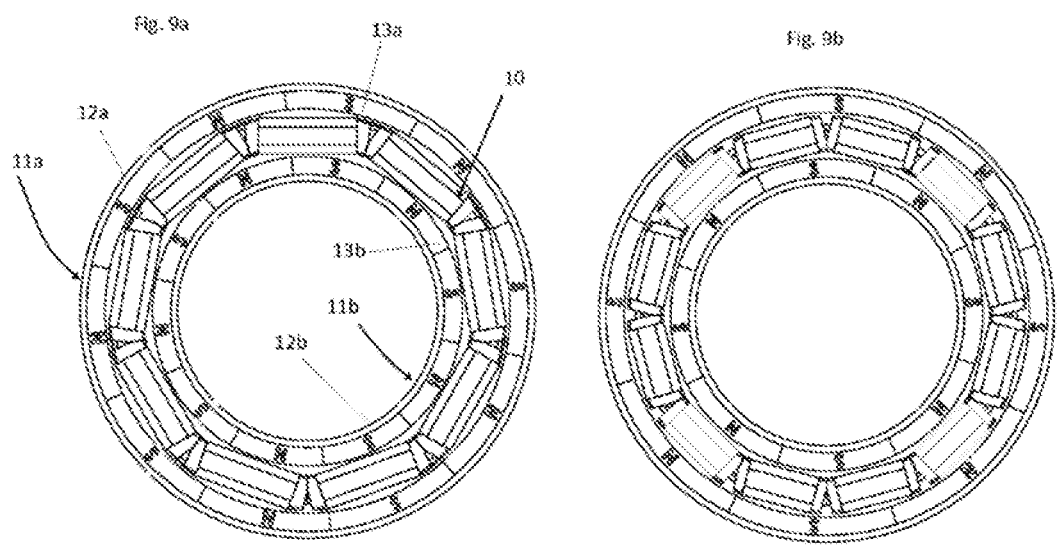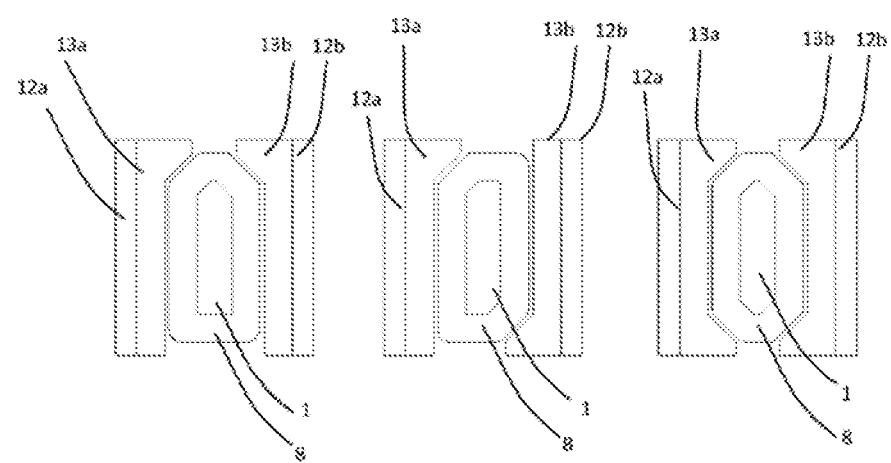

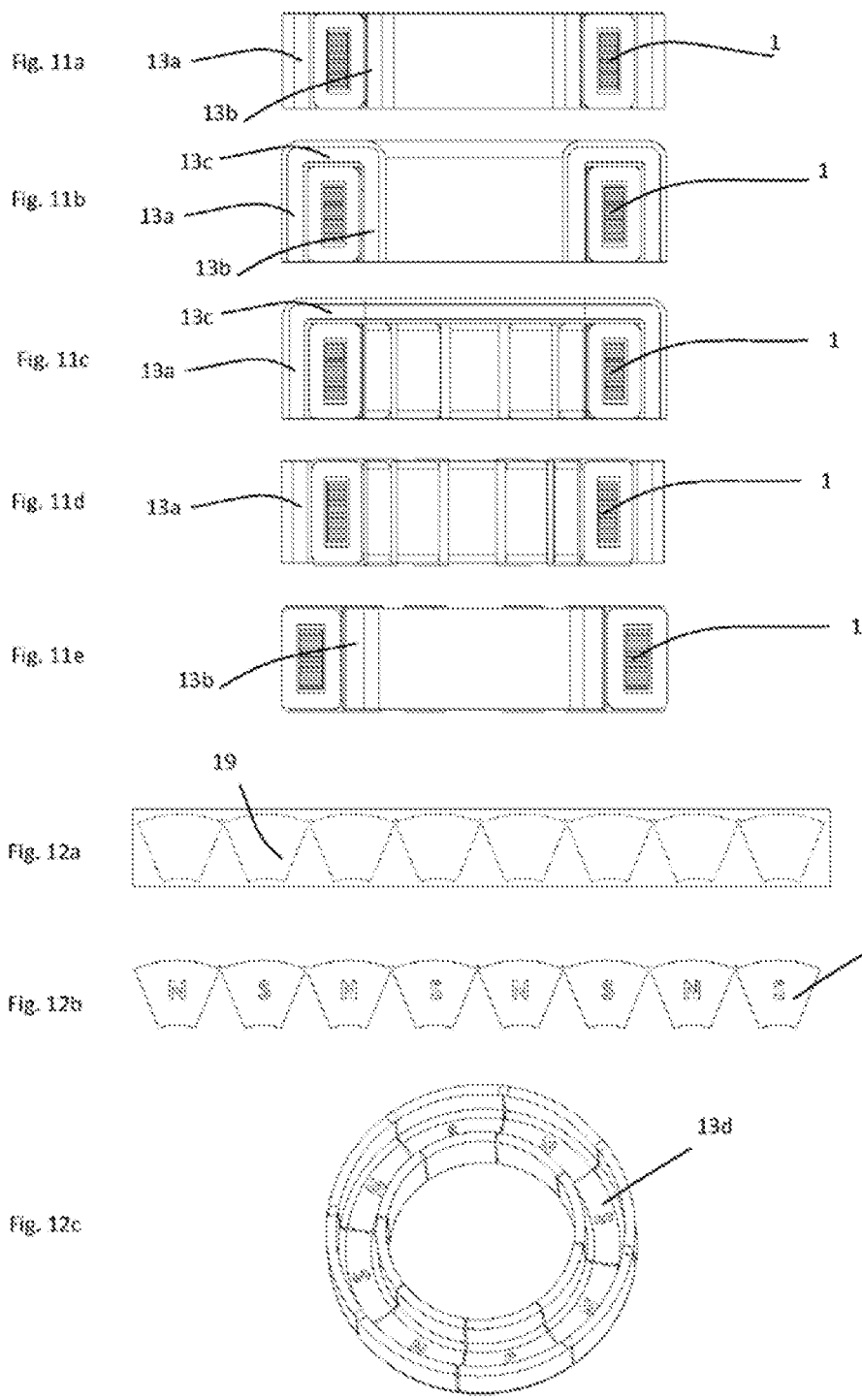

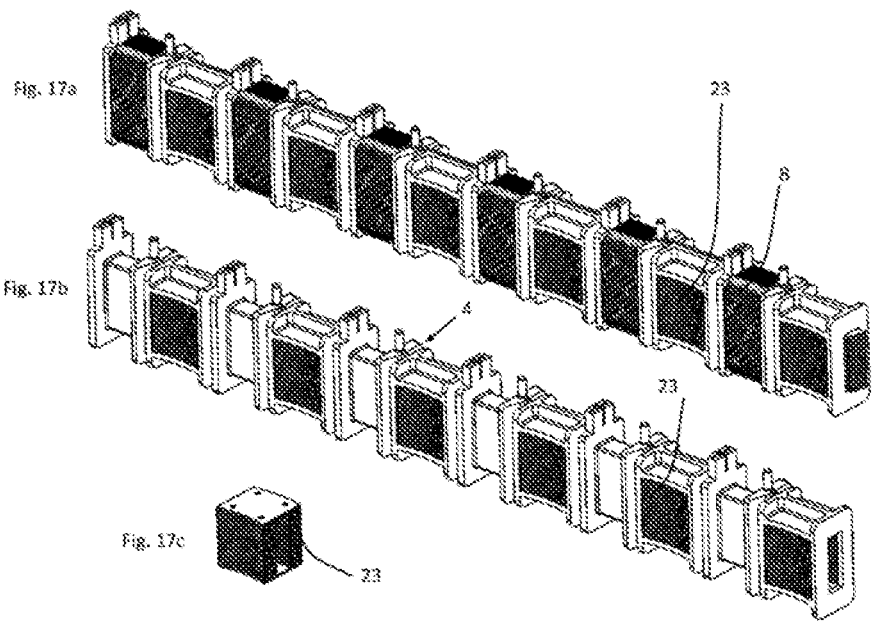
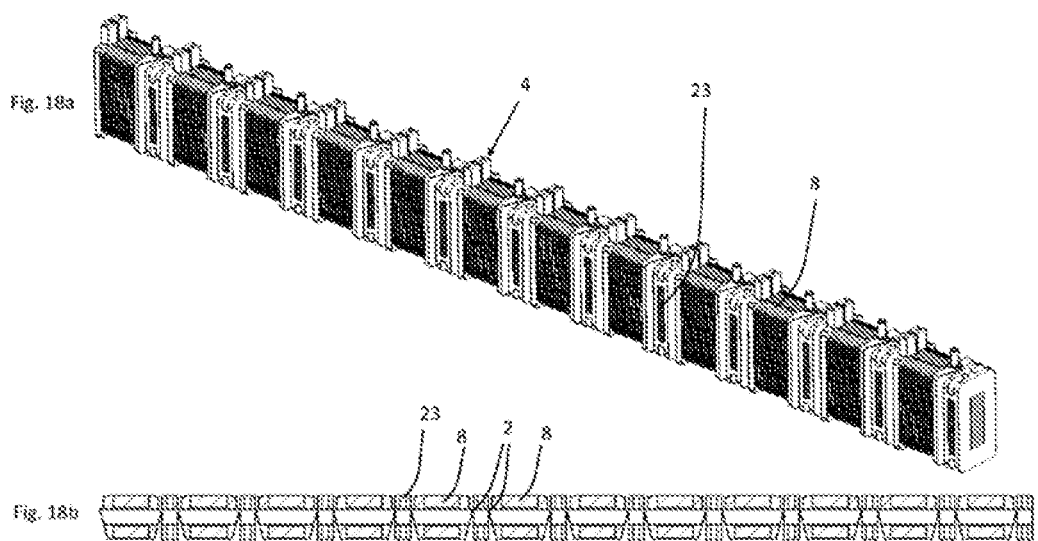

TOROIDAL POLYPHASE ELECTRIC MACHINE

CROSS-REFERENCE TO RELATED APPLICATIONS

This application is a National Phase Entry of International Patent Application No. PCT/FR2018/052572, filed on Oct. 16, 2018, which claims priority to French Patent Application No. 17/59751, filed on Oct. 17, 2017, both of which are incorporated by reference herein.

TECHNICAL FIELD

The invention relates to the field of polyphase electric machines and more particularly to an advantageous production of machines known as toroidal coil machines or circumferential coil machines, that is to say machines in which the coil axes follow the circumferential direction of the stators of said machines. The invention also relates to a method for producing an electric machine of the toroidal type, enabling substantial advantages in terms of the number of parts and of performance.

BACKGROUND

Electric machines of the toroidal type are already known from the prior art, such as those described, for example, in the documents U.S. Pat. No. 9,470,238 and EP1324472. However, these devices have segmented stators, that is to say they are produced as a plurality of discrete parts on which coil assemblies are positioned singly, said assemblies being subsequently joined together. Although this construction allows technically viable production, nevertheless it involves a substantial number of manufacturing and manipulating steps, which makes the industrial and economic viability difficult.

Furthermore, the earlier document JP1980173254 is also known, which describes the production of a toroidal coil motor. In the illustrated embodiments, discrete coils are inserted one by one on a wound strip of material, forming the ferromagnetic stator of the machine. This embodiment also appears of little interest industrially because of the large number of parts, in this case coiled assemblies, to be produced and positioned precisely on the stator. Moreover, the wound form of the stator does not aid the implementation.

More recently, U.S. Pat. No. 7,145,280 discloses an improved embodiment of a toroidal machine based on a ferromagnetic core in the form of a strip on which the coils are positioned separately. This embodiment improves the preceding embodiments, but still poses a problem in terms of the number of separate parts to be manipulated, and it does not explain how the core is to be wound once the coils have been fitted. It appears difficult to imagine winding a thick solid material, so that only small sections of cores are realistic, which means an embodiment of machines with low performance.

SUMMARY

The present invention aims to remedy the drawbacks of the prior art by proposing an embodiment which is simplified and more economically viable. In particular, the invention aims to reduce the number of parts used in order to produce a toroidal electric machine. It is also an objective of the invention to enable simplified winding of the stator of the machine by the use of a particular geometry. It is also an objective of the invention to propose a production method which simplifies the techniques used in the prior art.

More particularly, the invention proposes an electric machine having a rotor comprising a set of permanent magnets and a stator comprising a stator strip made of a soft ferromagnetic material, said strip supporting a coil body supporting a plurality of wire coils so as to form the polyphase coil stator assembly of the toroidal type. The strip advantageously has one single discontinuity and periodically has at least one partial cut between two consecutive wire coils in order to obtain a polygonal shape of said strip inside said plurality of wire coils. In different embodiments the machine has:
- a rotor with two radial rows of permanent magnets situated on either side, radially, of the coiled stator assembly,
- a rotor with a third row of magnets situated radially at the same level of the coiled stator assembly and axially above said coiled stator assembly,
- a ring with a soldered joint ensuring the circumferential closure of said ring. Alternatively, polar parts are inserted in the coil body, between the consecutive wire coils, and there are two partial cuts in the strip.

In particular embodiments, the invention relates to a three-phase machine. The assembly of wire coils is wound with a continuous wire in order to produce a connection between said three phases, and the electrical assembly of the three phases is produced by local cutting of the wires. The polyphase coil stator assembly is in a star form or is parallel with, for each phase, series or parallel assemblies of several wire coils.

The invention also proposes a method of winding a stator assembly for an electric machine with a toroidal coil arrangement, comprising a sequence of steps consisting of:
- forming a linear continuous strip of a ferromagnetic material having periodic partial cuts forming, for each cut, two separate flanks,
- forming a linear continuous coil body having a set of receiving zones,
- forming an assembly of coils arranged in a linear arrangement of adjacent coils accommodated in said receiving zones, said coils with linear arrangement being wound with a continuous wire or a continuous set of parallel wires for each phase,
- bending the linear arrangement of the stator assembly formed by said linear continuous strip from a ferromagnetic material, by said linear continuous coil body and by said set of coils in order to constitute a torus, in which the coils aligned along a circumference form a toroidal winding of an electrical machine and for which said separate flanks are put in contact, and in which said strip has a polygonal shape inside the assembly of wire coils.

Preferably, for this method, said machine is a three-phase machine and said coils for linear arrangement are wound with a continuous wire and said continuous wire also produces the connection between said phases, and said continuous wire is then cut locally to produce the electrical assembly of the three phases. The polyphase coil stator assembly can be in a star form or parallel with, for each phase, series or parallel assemblies of several coils.

BRIEF DESCRIPTION OF THE DRAWINGS

Other characteristics and advantages of the present invention will become clearer by reading the following detailed embodiments, with reference to the appended drawings, in which, respectively:

FIGS. 1a, 1b and 1c show respectively a view of a detail of an unwound stator of a machine according to the invention before insertion of the coil body, a detail view of a linear matrix of strips and a detail view of a matrix of superimposed strips;

FIGS. 2a, 2b and 2c show views of details of a cut in an unwound stator strip of a machine according to the invention before insertion of the coil body;

FIGS. 3a and 3b show views of details of an unwound coil body intended for a machine according to the invention and according to two different embodiments;

FIG. 4 shows a view of a detail of a coil body according to FIG. 3a on which electrical wires are wound;

FIGS. 5a and 5b show views of details of a coil body intended for a machine according to the invention, showing respectively an example of the passage of the coil wire and the flexible bridges of the coil body;

FIG. 6 shows a view of a detail of a coil body according to the invention showing the coil arrangement of a particular machine;

FIGS. 7a and 7b show views of details of the coil body, respectively wound and not wound, of FIG. 4 in which the unwound stator of FIG. 1 is inserted respectively after or before the winding of the body;

FIGS. 8a to 8d show views of details of examples of closure of the stator assembly;

FIGS. 9a and 9b show axial views of details of a machine according to the invention in two different embodiments;

FIGS. 10a, 10b and 10c show views of details in cross-section of examples of machines according to the invention with different use of magnets;

FIGS. 11a, 11b, 11c, 11d and 11e show views of details in cross-section of examples of machines according to the invention with different use of magnets;

FIGS. 12a, 12b and 12c show views of details of a particular embodiment of the magnets of a machine according to the invention;

FIGS. 17a, 17b and 17c show views of details of a first embodiment including ferromagnetic poles; and FIGS. 18a and 18b show views of a second embodiment including ferromagnetic poles.

DETAILED DESCRIPTION

Figure 13:
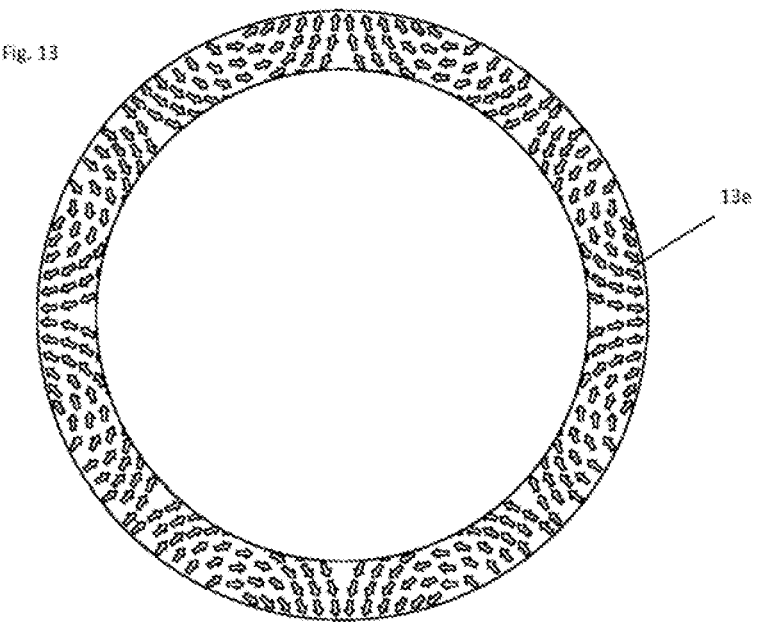
FIG. 13 shows a view of a detail of a magnetized ring of a machine according to the invention according to a particular embodiment.

A first part of the subject matter of the invention can be seen in FIG. 1a, which shows an unwound stator strip (1) of an electric machine according to the invention. This stator strip (1) is generally in the form of a sheet of soft ferromagnetic material, and several of these strips can be superimposed in order to obtain a band which forms the core of the stator. This stator band (1) comprises cuts at regular intervals, the shape of which can be variable but can allow contact between the lateral flanks (3a, 3b), more visible in FIGS. 2a to 2c, during the winding of the stator strip (1), while these flanks (3a, 3b) are separated in this unwound form. The shape of the cut (2) and of the flanks (3a, 3b) is not limiting, and FIGS. 2a to 2c only show some embodiments. In the example of FIGS. 2a and 2b, for a stator intended to have 12 coils, the angle formed by the cut (12) will preferably be close to 30° in order to allow contact of the flanks (3a, 3b). In the example of FIG. 2c, for a stator intended to have 9 coils, the angle formed by the cut (12) will preferably be close to 40°. In order to facilitate the elastic deformation it may be envisaged to perform a local removal of material (22) above the cut (12) as shown, by way of example, in FIG. 2b. The stator strip (1) can be produced from a matrix of linear continuous strips (15) as shown in FIG. 1c, or from a matrix of superimposed strips (16) as shown in FIG. 1b, without these examples being limiting in their possible embodiments.

A second part of the subject matter can be seen in FIGS. 3a and 3b, showing a coil body (4) of an electric machine according to the invention and according to two different embodiments. This coil body (4) is in the form of a linear strip before the mounting of the stator and is produced from an electrically insulating material, preferably of the plastic type. The coil body (4) may possibly be loaded with ferromagnetic particles in order to improve the magnetic performance of the machine. The coil body (4) has a plurality of receiving zones (5), the number of which is preferably equal to the number of cuts (2) in the stator strip (1) minus one unit. In the first embodiment in FIG. 3a, the coil body (4) also has a succession of pins intended to allow the guiding of a coil wire (not shown here) and cavities known as internal displacement contacts IDC (7) intended to receive connecting strips (not shown) of the insulation displacement type. The placement and the number of these pins (6) and cavities (7) vary according to the type of connection—series, parallel, star, triangle—and are given here by way of example for a machine with 12 coils serially connected in a triangle. Furthermore, the body of the coil (4) has a longitudinal through opening (9).

A second example of a coil body (4) is given in FIG. 3b. This coil body (4) does not have a pin (6) but only IDC cavities which also allow the guiding of the wires.

Figure 16:
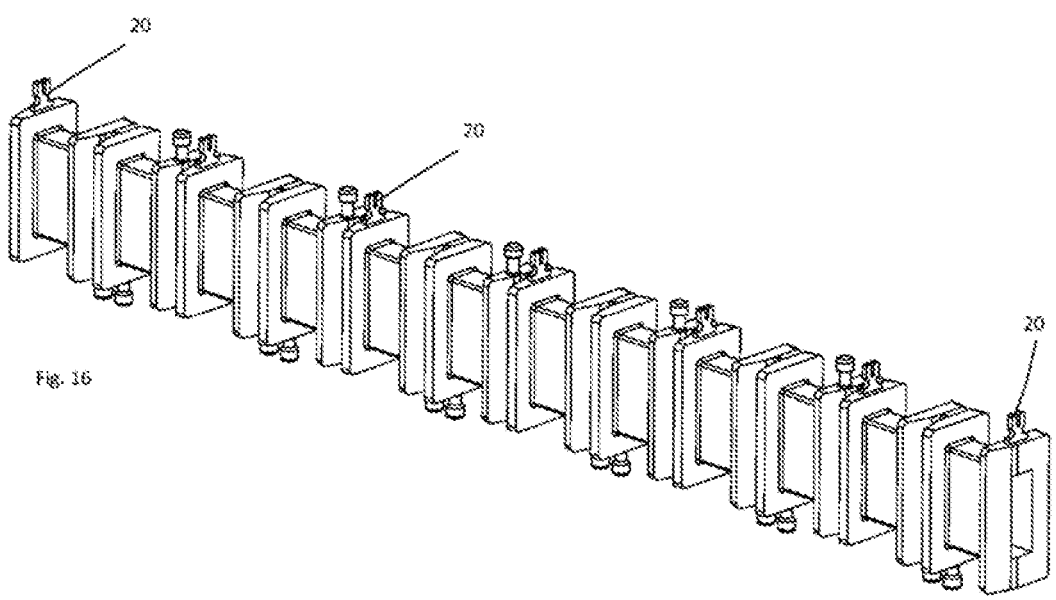
FIG. 16 shows an alternative embodiment of a coil body according to the invention.

A third example of a coil body (4) is given in FIG. 16. This coil body (4) has forks (20) for soldering the wires when this solution is preferred.

FIG. 4 shows the coil body (4) after winding of a conductor wire (8) (typically made of copper, silver or aluminum). The winding process and the advantages of the coil body (4) are explained in FIGS. 5 and 6. FIG. 5a shows, for example, in a detail view of some receiving zones (5) of the coil body (4), the theoretical path of a wire (8) around the pins (6)—if the coil body (4) comprises such pins (6)—in a clockwise (CW) or counter-clockwise (CCW) direction relative to the longitudinal opening (9). The pins (6) serve to guide the wire (8) during the winding and to ensure that it remains on the center line, that is to say in the plane longitudinally intersecting the coil body (4) and passing through the IDC cavities (7), during the winding.

FIG. 5b illustrates the flexible bridges (21) which are situated between the receiving zones (5) of the coil body (4) and which allow continuous connection thereof. These bridges (21) also give the degree of freedom to the coil body (4) that allows them to deform during the shaping of the stator assembly (10). In the example illustrated here, there are two of these bridges (21) between each pair of receiving zones (5), and they are situated on the lower part and the upper part of the body (5) on either side of the stator strip (1) (not shown here) and symmetrically over the depth of the body (4). This embodiment of the bridges (21) is not limiting and the shape, the position and the number of bridges (21) can be modified without departing from the scope of the invention.

FIG. 6 shows that it is possible, with the concept of the present invention, to wind all of the coil body (4) with one single wire (8) in one continuous operation. The three strings of coil bodies (4) of this FIG. 6 represent one and the same coil body (4) but are represented in three stages of winding the wire (8) to aid understanding. Thus, for the winding of a stator supporting 12 coils in one operation, of which the wiring is in a so-called "series/parallel triangle," that is to say having 4 coils per phase, and of which the coils of one phase are in series one by one and in parallel two by two, it is possible to make one single wire (8) run around as shown and to cut said wire (8) at two locations, the scissors schematically representing the necessary locations for the cuts. This "series/parallel triangle" coil arrangement is given only by way of example and is in no way limiting. Thus it is possible to produce different forms of wiring while respecting the invention, although this form of wiring is preferred because of its simplicity.

Once the coil body (4) has been wound, it receives in its longitudinal opening (9) the superimposed unwound stator strips (1) which are therefore inserted in the coil body (4) in the direction indicated by the thick arrow in FIG. 7a. It should also be noted that it is possible, always according to the invention, to provide for the stator strip (1) to be fitted in the coil body (4) before winding of the latter, as illustrated in FIG. 7b.

Once the coil body (4) has been wound and the stator strip (1) has been inserted—before or after winding—the stator assembly (10) thus formed is given a circular shape by bending it in the region of the cuts (2). The stator assembly (10) is then closed in different ways, as illustrated in FIGS. 8a and 8d. In FIG. 8a, the joint is produced by soldering (17), in FIG. 8b the joint is produced by the coil body (4), in FIG. 8c the joint is produced by a part (18) attached in the region of the coil body (4), and in FIG. 8d the joint is produced by a counterpart (19) in the region of the stator strip (1). A dovetail joint may also be envisaged (not shown) in the region of the stator strip (1). Likewise, the joint for closing the stator assembly can be produced by overmolding with an injectable material.

FIGS. 9a and 9b show an electric machine according to the invention in three different embodiments, by way of example, once the stator strip (1) has been inserted in the coil body (4) and the stator assembly (10) has been wound so that the flanks (3a, 3b) are joined. The stator strip (1) has a polygonal shape inside said plurality of wire coils. The machine according to the example of FIG. 9a is a three-phase machine having 9 coils and two rotors (11a, 11b) formed by multipolar magnet rings (13a, 13b) with alternating north and south polarities—in this case 5 pairs of poles for each rotor—and by ferromagnetic yokes (12a, 12b). The rotors (11a, 11b) are situated respectively outside and inside the stator assembly (10), viewed radially, and are advantageously fixed to one another. In the second embodiment in FIG. 9b, the machine comprises 12 coils and 4 pairs of poles per rotor (11a, 11b).

It should be noted that the shape of the multipolar ring magnets (13a, 13b) can be variable and in particular can have radial extensions (14), as shown in FIGS. 10a to 10c, in order to increase the active surface of the magnets (13a, 13b) facing the wound wire (8). In these FIGS. 10a to 10c, which show sectional views of a detail of a machine according to the invention, the coil body (4) is not shown in order to simplify understanding.

The invention makes it possible to use an inner magnet (13b) and an outer magnet (13a), as shown in FIG. 11a, but also to use an additional axial magnet (13c) situated axially relative to the stator assembly (10), as shown in FIG. 11b, or to use a radial magnet and an axial magnet, as shown in FIG. 11c. Advantageously, the magnets (13a, 13b and 13c) are connected to one another. According to the invention it is possible to use only one single inner magnet (13b), as shown in FIG. 11d, or one single outer magnet (13a), as shown in FIG. 11e.

The different magnetized rings used for a machine according to the invention can be rigid rings or can be provided in the form of a flexible strip (19), illustrated in FIG. 12a, cut out to form a magnet (13d) and magnetized to produce a magnetized string illustrated in FIG. 12b, then shaped and positioned inside the ferromagnetic yoke (12a) as illustrated in FIG. 12c. The magnetization of the magnets of a machine according to the invention can be implemented in a unidirectional radial manner, as shown in FIGS. 9a, 9b and 9c, or can be implemented as a sinusoidal evolution of the magnetization angle as shown in FIG. 13—the thick arrows indicating the local direction of magnetization in the magnet. In this embodiment it is possible to eliminate the use of the yoke, as the magnetic field forms a loop principally inside the magnet (13e), which makes it possible in particular to improve the dynamic performance of the magnet by reducing the inertia of the rotor and phase inductance.

Figure 14A:
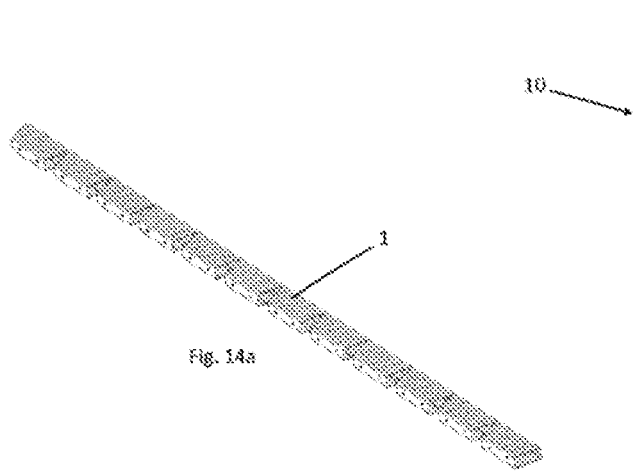
FIGS. 14a, 14b and 14c show views of details of a particular embodiment of the magnets of a machine according to the invention.
Figure 14B:
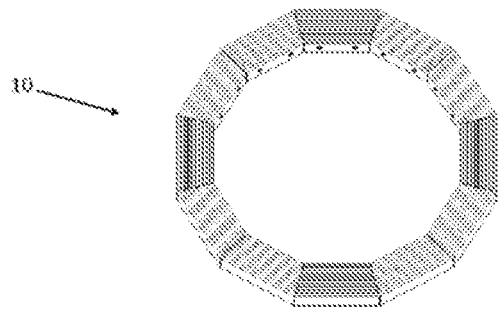
Figure 14C:
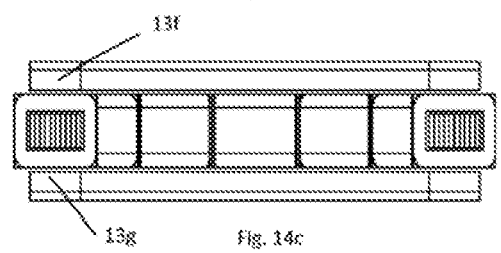

FIGS. 14a to 14c show illustrations of an embodiment according to the invention of a machine with axial flux. The stator strip (1) consists of a plurality of ferromagnetic sheets stacked according to the width of the strip (1) and, after fitting of the stator assembly (10), the magnets (13f, 13g) are situated axially on either side of said stator assembly.

Figure 15:
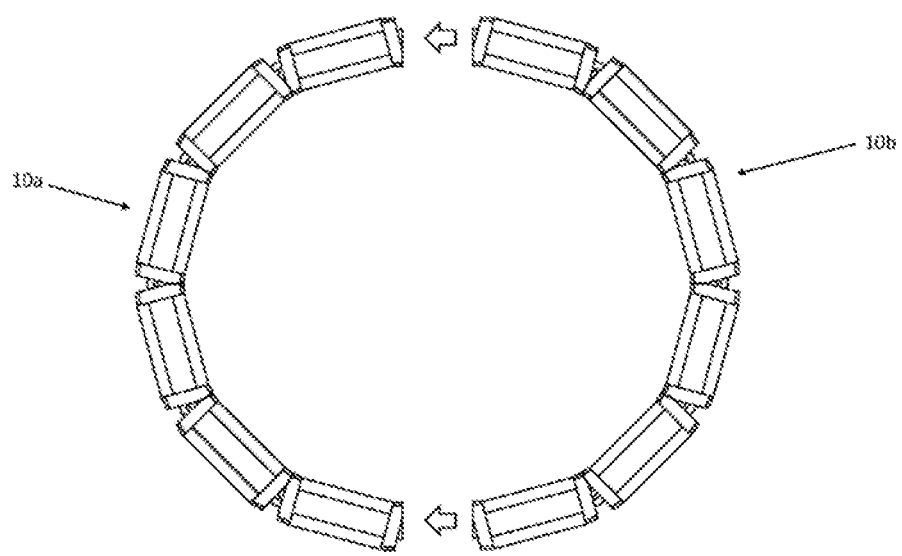
FIG. 15 shows a view of a detail of an embodiment of a machine with two independent electrical networks.

The invention also makes it possible to produce a machine having two independent networks of coils in order to be able to ensure the operation of the machine even when one or the other of the coil networks is defective (short-circuit, for example). FIG. 15 illustrates the concept of this particular embodiment with two different stator assemblies (10a, 10b) which are implemented separately in an identical manner to that set out above and are then assembled with one another, for example according to the techniques shown in FIGS. 8a to 8d.

The previously described embodiments all relate to topologies of so-called "slotless" electrical machines, but this characteristic is in no way limiting. In fact, as can be seen in the embodiments of FIGS. 17a, 17b, 17c, 18a and 18b, it is possible to envisage the implementation of a machine with slots by integration of the polar parts (23), that is to say the ferromagnetic poles, while respecting the spirit of the invention. FIGS. 17a and 17b show the coil body (4) respectively with and without the wound conductor wires (8) for a machine stator having 6 polar parts and 6 wire coils (8). These bodies (4) have polar parts (23) which are inserted and of which the geometry is shown, for example, in FIG. 17c. In this non-limiting example, each polar part is shown in the form of stacked sheet parts. It may now be envisaged that these polar parts are solid. Within the spirit of the invention, these polar parts (23) are inserted mechanically before or after the winding of wires (8) in the coil body (4).

FIG. 18a shows a second example in which polar parts (23) are attached in the coil body (4) for a machine which here has 12 polar parts (23) and 12 wire coils (8). FIG. 18b is a longitudinal sectional view of FIG. 18a which shows, in particular, the cuts (2), of which there are two, between the wire coils (8), in order to allow the winding of the stator assembly in order to produce a rotating machine.

The invention claimed is:

1. An electric machine having a rotor comprising a set of permanent magnets and at least one toroidal polyphase coil stator assembly comprising a stator strip made of a soft ferromagnetic material, the strip slidably is received within an elongated opening between flanks of a continuous unitary coil body, said unitary coil body having a plurality of spaced-apart receiving zones around which a plurality of wire coils are wound so as to form the toroidal polyphase coil stator assembly, said spaced-apart receiving zones coupled together with flexible bridges to form the continuous unitary coil body, the strip periodically having at least one partial cut between two consecutive wire coils in order to obtain a polygonal shape of the strip inside the plurality of wire coils.

2. The electric machine according to claim 1, wherein the rotor has two radial rows of the permanent magnets situated on either side, radially, of the coil stator assembly.

3. The electric machine according to claim 2, wherein the rotor has a third row of the magnets situated radially at a same level of the coil stator assembly and axially above the coil stator assembly.

4. The electric machine according to claim 1, wherein the strip has a soldered joint ensuring a circumferential closure of the strip.

5. The electric machine according to claim 1, wherein polar parts are inserted in the coil body, between two consecutive wire coils, and there are two partial cuts in the strip.

6. The electric machine according to claim 1, wherein the machine is a three-phase machine, the assembly of the wire coils is wound with a continuous wire in order to produce a connection between three phases, and the electrical assembly of the three phases is produced by local cutting of the wires.

7. The electric machine according to claim 1, wherein the polyphase coil stator assembly is in a star form or parallel with, for each phase, series or parallel assemblies of several of the wire coils.

* * * * *